L. G. BINKLEY.
CAR WHEEL MOUNTING.
APPLICATION FILED SEPT. 9, 1918.
1,329,495.
Patented Feb. 3, 1920.
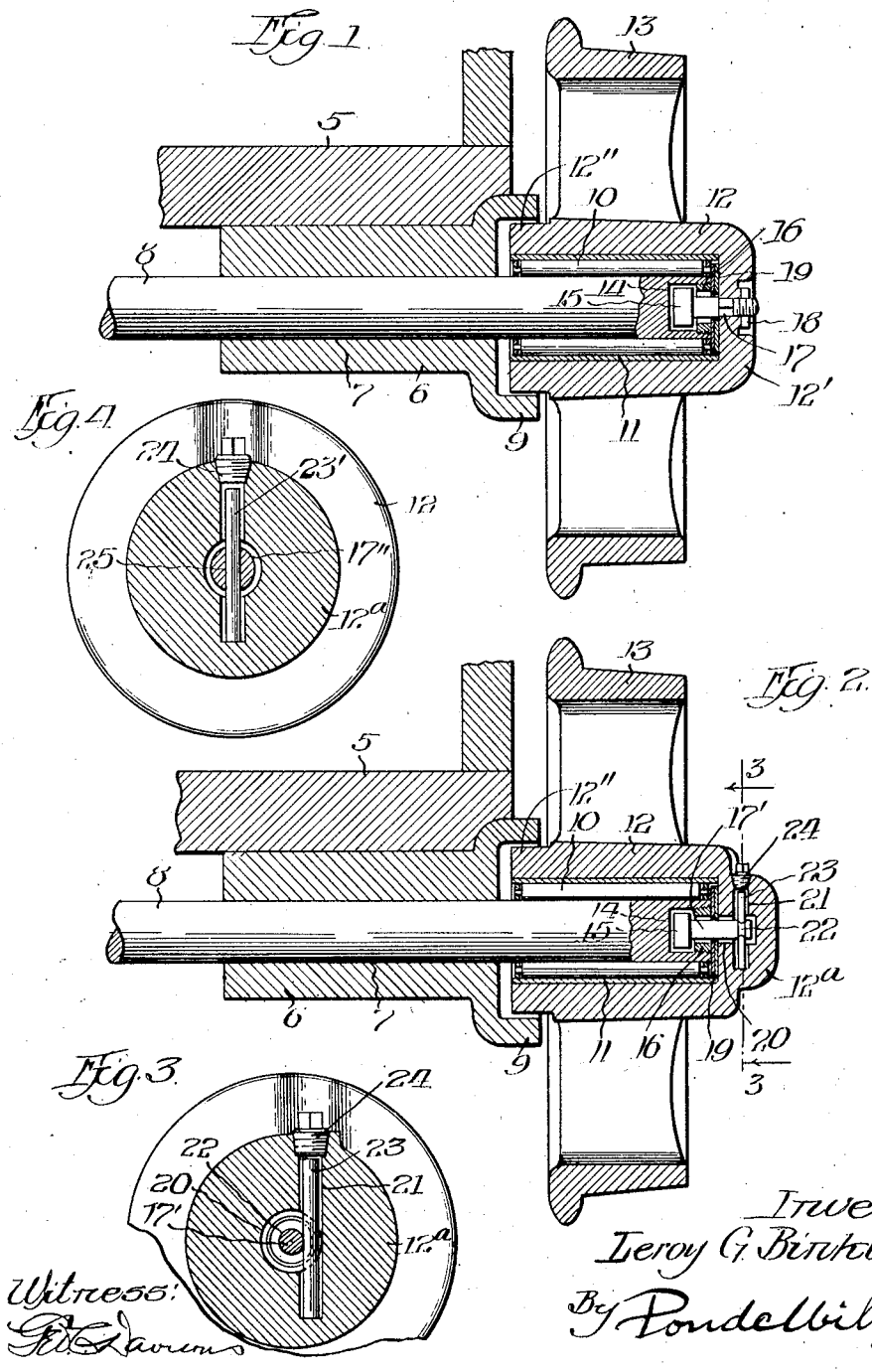
Inventor
Leroy G. Binkley

UNITED STATES PATENT OFFICE.

LEROY G. BINKLEY, OF CHICAGO, ILLINOIS, ASSIGNOR TO RAILWAY & MINE SUPPLY COMPANY, OF CHICAGO, ILLINOIS, A CORPORATION OF ILLINOIS.

CAR-WHEEL MOUNTING.

1,329,495.  Specification of Letters Patent.  Patented Feb. 3, 1920.

Application filed September 9, 1918. Serial No. 253,331.

*To all whom it may concern:*

Be it known that I, LEROY G. BINKLEY, a citizen of the United States, residing at Chicago, in the county of Cook and State of Illinois, have invented certain new and useful Improvements in Car-Wheel Mountings, of which the following is a specification.

This invention relates to the general art of railway cars, and has reference more particularly to mine cars. Owing to the sharp curves of the tracks on which mine cars travel, it is necessary to mount the wheels of mine cars rotatably upon their axles, and further to provide means for preventing endwise displacement of the wheels from the axles. In one type of mine cars the wheel is attached to the bearing-box of the axle, while in another the wheel is attached to the axle itself. My present invention relates to cars of the latter type, and the main object of the invention is to provide a simple and improved means for locking the wheel on the axle, which shall allow the ready removal of the wheel when necessary, and which may also facilitate the oiling of the wheel bearing. Another object is to provide an improved construction wherein the inward thrust of the wheel or the outward thrust of the axle shall be resisted at the outer end of the axle with a minimum of friction and wear.

Other objects and advantages of the invention will be apparent to those skilled in the art from the following detailed description, taken in connection with the accompanying drawing in which I have illustrated practical and workable embodiments of the invention, and wherein—

Figure 1 is a vertical section through one of the bearing-boxes and adjacent wheel of a mine car in the plane of the axis of the axle, showing one embodiment of the invention;

Fig. 2 is a similar view of another embodiment of the same principle, showing a different means for securing the locking bolt to the transverse outer end wall of the wheel hub, which has the additional function of facilitating the application of lubricant to the wheel bearings and to the washers which receive the end thrust;

Fig. 3 is an enlarged section on the line 3—3 of Fig. 2; and

Fig. 4 is a view similar to Fig. 3, showing a slight modification.

Referring to the drawing, 5 designates the floor of the car body, to the under side of which is secured the axle bearing-box 6, this latter being formed with a bearing opening or passage 7 to receive the axle 8 and at its outer end with an annular flange 9. The axle 8 projects beyond the outer end of the bearing-box, and on the projecting end is mounted, preferably by roller-bearings 10 and a hardened steel bushing 11, the hub 12 of a wheel 13.

The outer end of the axle 8 is formed with a recess 14 the wall of which is preferably tapped for a distance inwardly of its outer end as shown, and in this recess is housed the head 15 of a locking bolt, the bolt-head being confined in this recess by a retaining member in the form of a nut 16 that encircles the shank or stem of the bolt and is screwed into the tapped end of the recess. The bolt has a reduced portion of its shank squared, as shown at 17, this squared portion fitting a square recess or hole formed in the outer end wall 12' of the hub 12; and the outer end of the bolt, beyond the squared portion, is threaded to receive a nut 18 preferably countersunk in the outer side of the end wall of the hub. By this means the wheel hub is securely locked to the axle, while free to rotate on the latter; and by simply removing the nut 18 the wheel may be withdrawn from the axle.

Encircling the shank of the locking bolt and lying between the outer end of the axle 8 and the end wall of the hub are a plurality of metal washers 19 which receive the wear caused by relative end thrusts between said parts.

The inner end 12" of the hub 12 projects within the flange 9 of the bearing box, said flange thus serving as a cover to prevent to a large extent the entry of dust and dirt to the wheel bearings through the inner end of the hub.

In the form of the invention shown in Figs. 2 and 3, the outer end wall 12ª of the hub is formed with a longitudinal recess 20, opposite and in line with the recess 14 of the axle, and also with a transverse recess 21 that intersects the longitudinal recess 20. The shank 17' of the locking bolt, which in this case may be round throughout, lies in the recess 20 and is formed near its outer end with an annular groove 22 that is engaged by a locking-pin 23 set in the transverse recess 21. The pin 23 is retained in place by a plug 24 screwed into and closing the open end of the recess 21. One very considerable advantage of this construction is that the recesses 21 and 20 may be utilized as oil ducts for lubricating the end-thrust washers and the bearings of the wheel by simply removing the plug 24 and introducing the nozzle of an oil can or a grease gun to the open end of the recess 21.

In the modification shown in Fig. 4, the shank 17″ of the locking bolt omits the annular groove 22 of Figs. 2 and 3, and in lieu thereof is provided with a transverse hole 25, through which is passed the locking-pin 23′. Otherwise, this construction is the same as that of Figs. 2 and 3.

It is believed that the foregoing description, in connection with the drawings, will make clear to those familiar with this art how the stated objects and advantages of the invention are obtained in the structures illustrated and described. Manifestly other changes in the detail structure and arrangement of the parts may be made without altering the substantial character of the invention or sacrificing any of the advantages thereof; and hence I reserve all such variations and modifications as fall within the spirit and purview of the appended claims.

I claim:

1. In a car wheel mounting, the combination of an axle having a recess in its outer end, a wheel hub mounted on said axle and formed with an outer end wall having a longitudinal recess opposite and in line with the recess of said axle and a transverse recess intersecting said longitudinal recess, a bolt having its shank disposed in said longitudinal recess and its head disposed in the recess of said axle, means for confining said bolt-head in said axle recess, and a locking pin for said bolt disposed in said transverse recess.

2. In a car wheel mounting, the combination of an axle having a recess in its outer end, a wheel hub mounted on said axle and formed with an outer end wall having a longitudinal recess opposite and in line with the recess of said axle and a transverse recess intersecting said longitudinal recess, a bolt having its shank disposed in said longitudinal recess and its head disposed in the recess of said axle, means for confining said bolt-head in said axle recess, a pin in said transverse recess lockingly engaging said bolt, and means for confining said pin in said transverse recess.

L. G. BINKLEY.